US011750488B1

(12) United States Patent
Kairali et al.

(10) Patent No.: US 11,750,488 B1
(45) Date of Patent: Sep. 5, 2023

(54) MINIMIZING LATENCY OF ROUND TRIP NETWORK COMMUNICATION IN A COMPUTING INFRASTRUCTURE

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/658,839

(22) Filed: Apr. 12, 2022

(51) Int. Cl.
*H04L 43/0864* (2022.01)
*H04L 43/067* (2022.01)
*H04L 43/0894* (2022.01)

(52) U.S. Cl.
CPC ........ *H04L 43/067* (2013.01); *H04L 43/0864* (2013.01); *H04L 43/0894* (2013.01)

(58) Field of Classification Search
None
See application file for complete search history.

(56) References Cited

U.S. PATENT DOCUMENTS

| | | | | |
|---|---|---|---|---|
| 10,503,748 B1* | 12/2019 | Farrow | ................. | G06F 16/245 |
| 2002/0087666 A1 | 7/2002 | Huffman | | |
| 2014/0344210 A1* | 11/2014 | Leigh | ................... | G06F 16/254 |
| | | | | 707/602 |
| 2014/0344211 A1* | 11/2014 | Allan | .................... | G06F 16/258 |
| | | | | 707/602 |
| 2016/0103914 A1 | 4/2016 | Im | | |
| 2017/0149687 A1* | 5/2017 | Udupi | ..................... | H04L 47/83 |
| 2021/0168203 A1* | 6/2021 | Parulkar | ................. | H04L 67/60 |

OTHER PUBLICATIONS

Author: Sivabalan et al. Title: "Heterogeneous Data Integration with ELT and Analytical MPP Database for Data Analysis Application" Publisher: IEEE (Year: 2021).*
Keller et al., "Response Time-Optimized Distributed Cloud Resource Allocation", DCC'14, Aug. 18, 2014, Chicago, Illinois, USA, Copyright 2014 ACM 978-1-4503-2992-7/14/08, 6 pages.

(Continued)

*Primary Examiner* — John A Follansbee
*Assistant Examiner* — Kamal M Hossain
(74) *Attorney, Agent, or Firm* — Edward Li (57) ABSTRACT

A computer-implemented method, a computer program product, and a computer system for minimizing latency in an infrastructure. One or more servers receive a request of deploying a new extract, load, and transform (ELT) logic. One or more servers analyze the new ELT logic to identify source and target locations, analyze logs of existing ELT logics, identify physical locations of infrastructure resources, and identify available physical spaces for moving the infrastructure resources close to each other. One or more servers determine infrastructure resources that need to be moved so that round trip network communication of the new ELT logic are optimized, based on the physical locations of the infrastructure resources, the available physical spaces, and parameters identified through analysis of existing ELT logics. One or more servers move the infrastructure resources that need to be moved.

20 Claims, 6 Drawing Sheets

(56) References Cited

OTHER PUBLICATIONS

Mell et al., "The NIST Definition of Cloud Computing", NIST National Institute of Standards and Technology U.S. Department of Commerce, Special Publication 800-145, Sep. 2011, 7 pages.

Popescu, Diana Andreea, "Latency-driven performance in data centres", University of Cambridge Computer Laboratory, No. 937, Jun. 2019, United Kingdom, 190 pages.

Wei et al., "AIMING: Resource Allocation with Latency Awareness for Federated-Cloud Applications", WILEY, Hindawi Wireless Communications and Mobile Computing vol. 2018, Article ID 4593208, 12 pages.

* cited by examiner

MINIMIZING LATENCY OF ROUND TRIP NETWORK COMMUNICATION IN A COMPUTING INFRASTRUCTURE

BACKGROUND

The present invention relates generally to a computing infrastructure, and more particularly to minimizing latency of round trip network communication in a computing infrastructure.

In a traditional datacenter environment, latency may be minimal since resources often share the same location and a common set of infrastructures. The time taken to get from a source to a destination is short when resources are physically close together.

However, in a cloud environment, cloud-hosted resources may not be in a same rack, datacenter, or even region. This distributed approach can have an impact on the round-trip time of network communication. While all regions are interconnected by a high-speed fiber backbone, the speed of light is still a physical limitation. Calls between services in different physical locations have network latency directly correlated to the distance between the different physical locations. Additionally, for a chattier application requiring a significant amount of communication, additional round trips are required. Each round trip comes with a latency tax, with each round trip adding to the overall latency.

SUMMARY

In one aspect, a computer-implemented method for minimizing latency in an infrastructure is provided. The method includes receiving a request of deploying a new extract, load, and transform (ELT) logic. The method further includes analyzing the new ELT logic to identify source and target locations. The method further includes analyzing logs of existing ELT logics. The method further includes identifying physical locations of infrastructure resources, based on the source and target locations from the new ELT logic and analysis of the logs. The method further includes identifying available physical spaces for moving the infrastructure resources close to each other. The method further includes determining infrastructure resources that need to be moved so that round trip network communication of the new ELT logic are minimized, based on the physical locations of the infrastructure resources, the available physical spaces, and parameters identified through analysis of the existing ELT logics. The method further includes moving the infrastructure resources that need to be moved.

In another aspect, a computer program product for minimizing latency in an infrastructure is provided. The computer program product comprises a computer readable storage medium having program instructions embodied therewith, and the program instructions are executable by one or more processors. The program instructions are executable to: receive a request of deploying a new extract, load, and transform (ELT) logic; analyze the new ELT logic to identify source and target locations; analyze logs of existing ELT logics; identify physical locations of infrastructure resources, based on the source and target locations from the new ELT logic and analysis of the logs; identify available physical spaces for moving the infrastructure resources close to each other; determine infrastructure resources that need to be moved so that round trip network communication of the new ELT logic are minimized, based on the physical locations of the infrastructure resources, the available physical spaces, and parameters identified through analysis of the existing ELT logics; and move the infrastructure resources that need to be moved.

In yet another aspect, a computer system for minimizing latency in an infrastructure is provided. The computer system comprises one or more processors, one or more computer readable tangible storage devices, and program instructions stored on at least one of the one or more computer readable tangible storage devices for execution by at least one of the one or more processors. The program instructions are executable to receive a request of deploying a new extract, load, and transform (ELT) logic. The program instructions are further executable to analyze the new ELT logic to identify source and target locations. The program instructions are further executable to analyze logs of existing ELT logics. The program instructions are further executable to identify physical locations of infrastructure resources, based on the source and target locations from the new ELT logic and analysis of the logs. The program instructions are further executable to identify available physical spaces for moving the infrastructure resources close to each other. The program instructions are further executable to determine infrastructure resources that need to be moved so that round trip network communication of the new ELT logic are minimized, based on the physical locations of the infrastructure resources, the available physical spaces, and parameters identified through analysis of the existing ELT logics. The program instructions are further executable to move the infrastructure resources that need to be moved.

DETAILED DESCRIPTION

Figure 1:
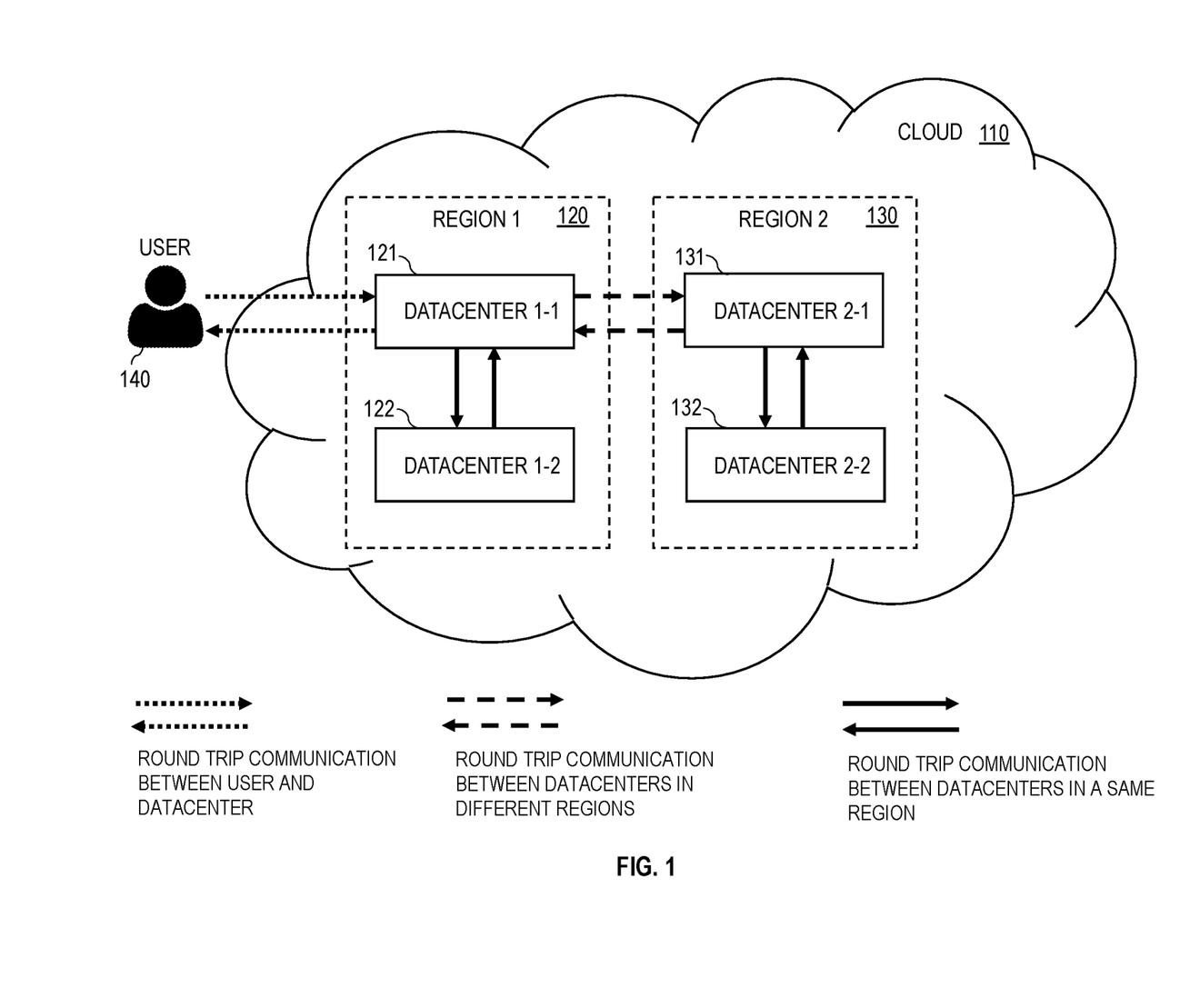
FIG. 1 is a diagram illustrating network communication in a computing infrastructure, in accordance with one embodiment of the present invention.

FIG. 1 is a diagram illustrating network communication in cloud 110, in accordance with one embodiment of the present invention. The cloud environment is described in more detail in later paragraphs with reference to FIG. 5 and FIG. 6.

Cloud resources in cloud 110 includes datacenters, namely datacenter 1-1 121, datacenter 1-2 122, datacenter 2-1 131, and datacenter 2-2 132. Datacenter 1-1 121 and datacenter 1-2 122 are located in region 1 120, while datacenter 2-1 131 and datacenter 2-2 132 are located in region 2 130. As shown in FIG. 1, the round trip communication between user 140 and datacenter 1-1 121 is denoted by dotted arrows. The round trip communication between datacenter 1-1 121 and datacenter 1-2 122 is between datacenters in region 1 120, and the round trip communication between datacenter 2-1 131 and datacenter 2-2 132 is between datacenters in region 2 130; round trip communication between datacenters in the same regions are denoted by solid arrows. The round trip communication between datacenter 1-1 121 and datacenter 2-1 131 is between two datacenters in different regions, i.e., region 1 120 and region 2 130. The round trip communication between two datacenters in different regions is denoted by dashed arrows.

In any cloud hosted application, data is moved from one cloud resource (or infrastructure resource) to another cloud renounce with an extract, load, and transform (ELT) approach. In this case, sources and targets may be present in different locations, regions, and datacenters; this increases round trip network communication latency with the ELT approach. Embodiments of the present invention disclose a system or method of optimizing positioning of the cloud resources so that network latency because of the round trip network communication can be minimized.

ELT is a process that a data pipeline uses to replicate data from a source system into a target system such as a cloud data warehouse. The ELT process includes three steps. (1) Extraction: Extraction is the first step that involves copying data from the source system. (2) Loading: During the loading step, the data pipeline replicates data from the source system into the target system which may be a data warehouse or a data lake. (3) Transformation: Once the data is in the target system, organizations run whatever transformations they need. Often, the organizations transform raw data in different ways for use with different tools or business processes.

In embodiments of the present invention, the proposed system or method analyzes ELT logics to identify data movement trajectories of different ELT methods. Different locations sources and targets of cloud resources are involved; accordingly, if the cloud resources are spread across locations of multiple datacenters, then the proposed system or method identifies how the cloud resources are to be placed in such a way that network latency because of round trip network communication can be optimized.

In embodiments of the present invention, the proposed system or method analyzes the volume of data movement with different ELT approaches, and accordingly the proposed system or method identifies which cloud resources are rearranged so that network latency because of round trip network communication can be optimized.

In embodiments of the present invention, the proposed system or method analyzes ELT data transfer logics based on the requirement and identifies how the cloud resources are to be stored physically in the datacenters so that network latency because of round trip network communication can be optimized.

In embodiments of the present invention, the proposed system or method analyzes ELT logics' logs generated by the ELT processes. The proposed system or method identifies which ELT logics are impacted because of round trip network communication latency and identifies which cloud resources will be placed close by.

In embodiments of the present invention, based on the existing cloud resources deployment locations and the request of developing a new ELT logic, the proposed system identifies where the new cloud resources are to be deployed.

Figure 2:
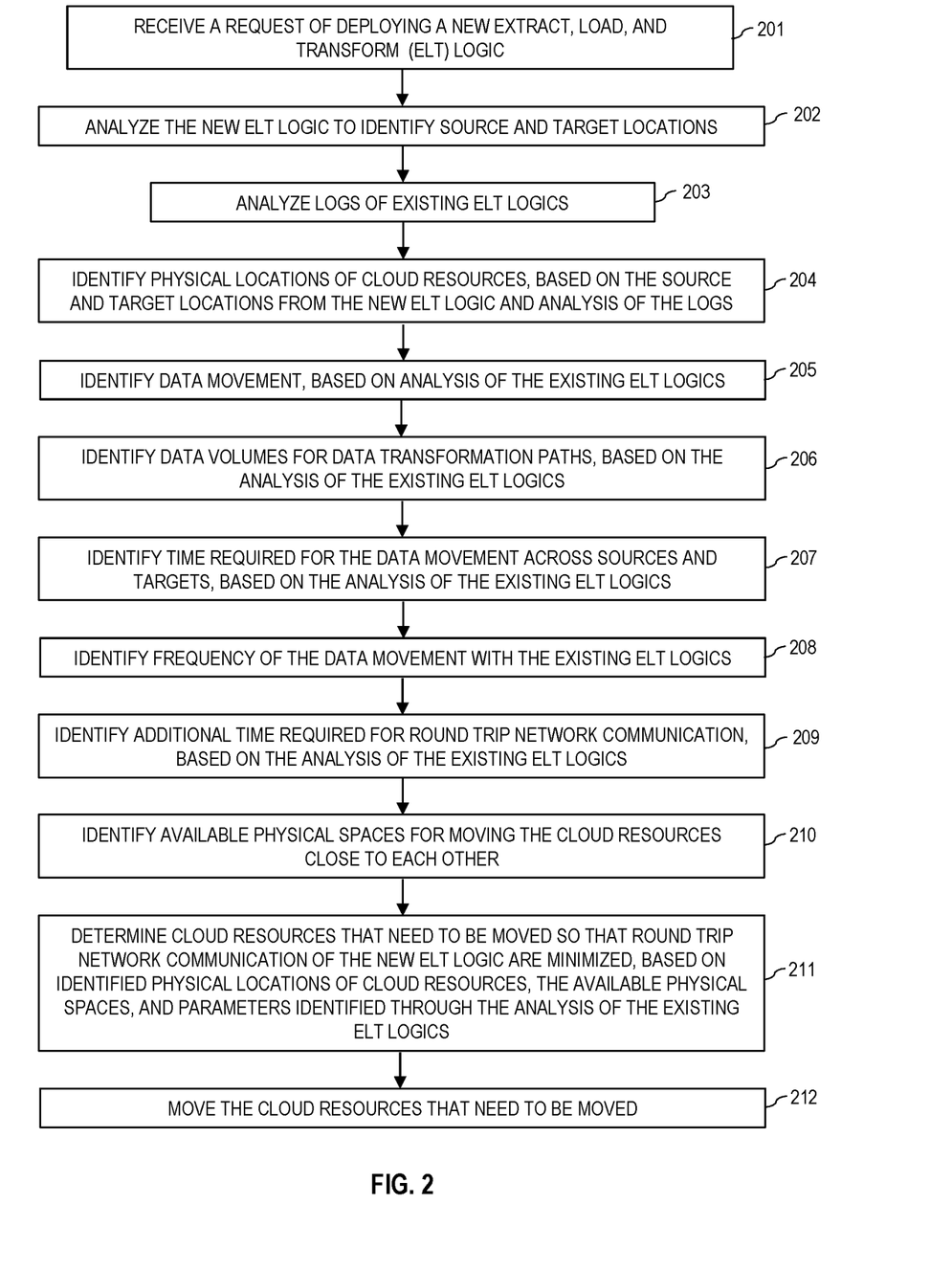
FIG. 2 is a flowchart showing operational steps of minimizing latency of round trip network communication in a computing infrastructure, in accordance with one embodiment of the present invention.

FIG. 2 is a flowchart showing operational steps of minimizing latency of round trip network communication in a computing infrastructure, in accordance with one embodiment of the present invention. The operational steps are implemented by the proposed system which is hosted on one or more computing devices or servers. A computing device or server is described in more detail in later paragraphs with reference to FIG. 4. The operational steps may be implemented in a cloud computing environment. The cloud computing environment is described in more detail in later paragraphs with reference to FIG. 5 and FIG. 6.

At step 201, the one or more computing devices or servers receive a request of deploying a new extract, load, and transform (ELT) logic. In an ELT process, there are different types of transformation methods. When a new ELT process is created, a new transformation method is created and therefore the new ELT logic will be deployed in the cloud or an infrastructure.

At step 202, the one or more computing devices or servers analyze the new ELT logic to identify source and target locations. For the new ELT logic, locations of sources and locations of targets need to be determined by analyzing the new ELT logic.

At step 203, the one or more computing devices or servers analyze logs of existing ELT logics. To minimize latency of round trip network communication for the new ELT logic, historical data of the existing ELT logics is analyzed. The historical data (including the logs) of the existing ELT logics may be stored in a database. The database may be on the one or more computing devices or servers or elsewhere in the cloud or the infrastructure.

At step 204, the one or more computing devices or servers identify physical locations of cloud resources, based on the source and target locations from the new ELT logic and analysis of the logs. From the information about the source and target locations determined at step 202 and the analysis of the historical logs done at step 203, physical locations of cloud resources or the infrastructure can be identified by the one or more computing devices or servers.

At step 205, the one or more computing devices or servers identify data movement, based on analysis of the existing ELT logics. Form analysis of the historical data of the existing ELT logics, the data movement between sources and targets in the could or the infrastructure can be identified by the one or more computing devices or servers.

At step 206, the one or more computing devices or servers identify data volumes for data transformation paths, based on the analysis of the existing ELT logics. Form the analysis of the historical data of the existing ELT logics, the data volumes for different data transformation paths are identified by the one or more computing devices or servers.

At step 207, the one or more computing devices or servers identify time required for the data movement across sources and targets, based on the analysis of the existing ELT logics. Form the analysis of the historical data of the existing ELT logics, time required for the data movement between the sources and the targets in the cloud or the infrastructure is identified by the one or more computing devices or servers.

At step 208, the one or more computing devices or servers identify frequency of the data movement with the existing ELT logics. Form the analysis of the historical data of the existing ELT logics, the frequency of the data movement in the cloud or the infrastructure is identified by the one or more computing devices or servers.

At step 209, the one or more computing devices or servers identify additional time required for round trip network communication, based on the analysis of the existing ELT logics. Form analysis of the historical data of the existing ELT logics, the additional time required for round trip between datacenters (as shown in FIG. 1) in the cloud or the infrastructure is identified by the one or more computing devices or servers.

At step 210, the one or more computing devices or servers identify available physical spaces for moving the cloud resources close to each other. To minimize latency of round trip network communication for the new ELT logic in the cloud or the infrastructure, the cloud resources are to be moved close to each other. Thus, available physical spaces in the datacenters for moving the cloud resources in the new ELT logic need to be identified.

At step 211, the one or more computing devices or servers determine cloud resources that need to be moved so that round trip network communication of the new ELT logic are minimized, based on identified physical locations of cloud resources, the available physical spaces, and parameters identified through the analysis of the existing ELT logics. To minimize latency of round trip network communication for the new ELT logic in the cloud or the infrastructure, some cloud resources are to be moved from one location to another. Before moving such cloud resources, it is necessary to determine which cloud resources can be moved; determining which cloud resources can be moved is based on the available physical spaces hosting the moved cloud resources. The parameters identified through the analysis of the existing ELT logics include the data movement (identified at step 205), the data volumes for data transformation paths (identified at step 206), time required for the data movement across sources and targets (identified at step 207), the frequency of the data movement (identified at step 208), and the additional time required for round trip network communications (identified at step 209).

At step 212, the one or more computing devices or servers move the cloud resources that need to be moved. The cloud resources that need to be moved are moved to the available spaces by the one or more computing devices or servers. Upon the cloud resources being moved, the cloud resources of the new ELT logic are close to each other and the round trip network communication of the new ELT logic are minimized.

Figure 3A:
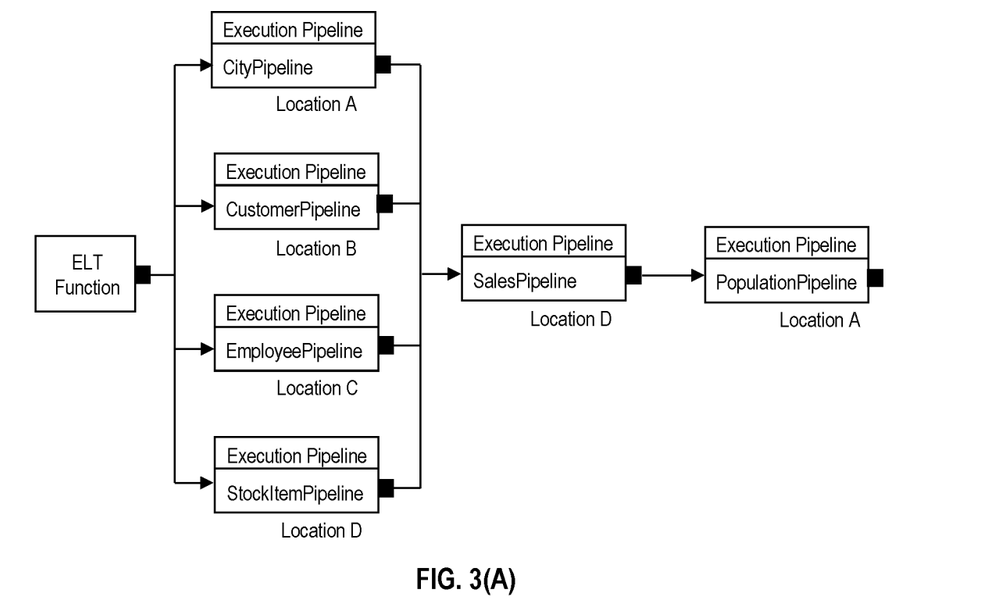
FIG. 3(A) is a diagram showing an extract, load, and transform (ELT) process prior to minimizing latency of round trip network communication, in which cloud resources are at different locations, in accordance with one embodiment of the present invention.

FIG. 3(A) is a diagram showing an extract, load, and transform (ELT) process prior to minimizing latency of round trip network communication, in which cloud resources are at different locations, in accordance with one embodiment of the present invention. Prior to minimizing latency of round trip network communication or prior to implementation of the operational steps shown in FIG. 2, the cloud resources are at different locations, which causes network latency.

Figure 3B:
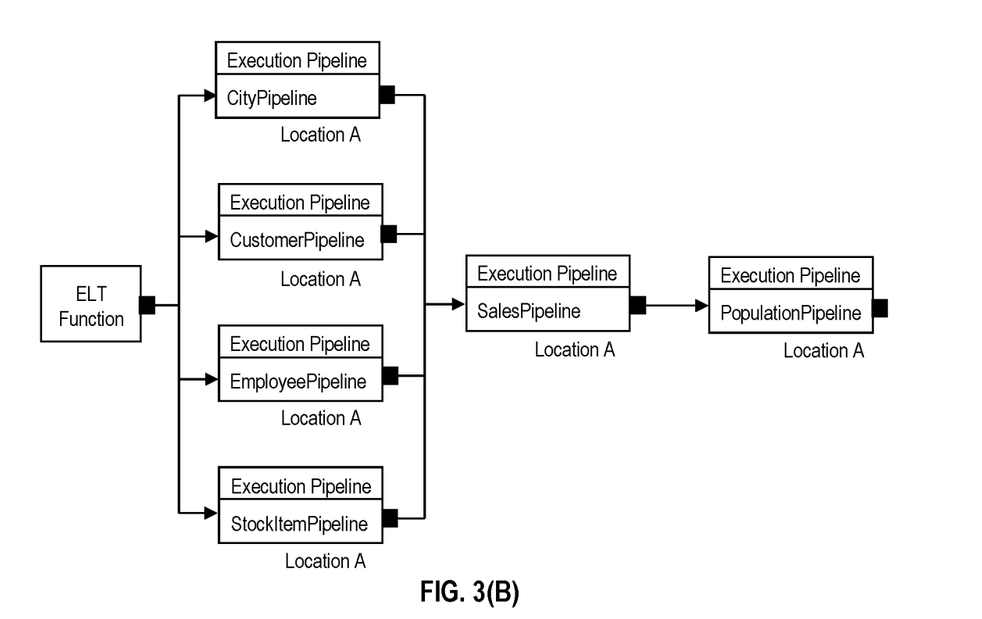
FIG. 3(B) is a diagram showing an extract, load, and transform (ELT) process after minimizing latency of round trip network communication, in which cloud resources are moved close to each other, in accordance with one embodiment of the present invention.

FIG. 3(B) is a diagram showing an extract, load, and transform (ELT) process after minimizing latency of round trip network communication, in which cloud resources are moved close to each other, in accordance with one embodiment of the present invention. By implementing the operational steps shown in FIG. 2, the cloud resources are moved close to each other, so that network latency because of round trip communication are minimized.

Figure 4:
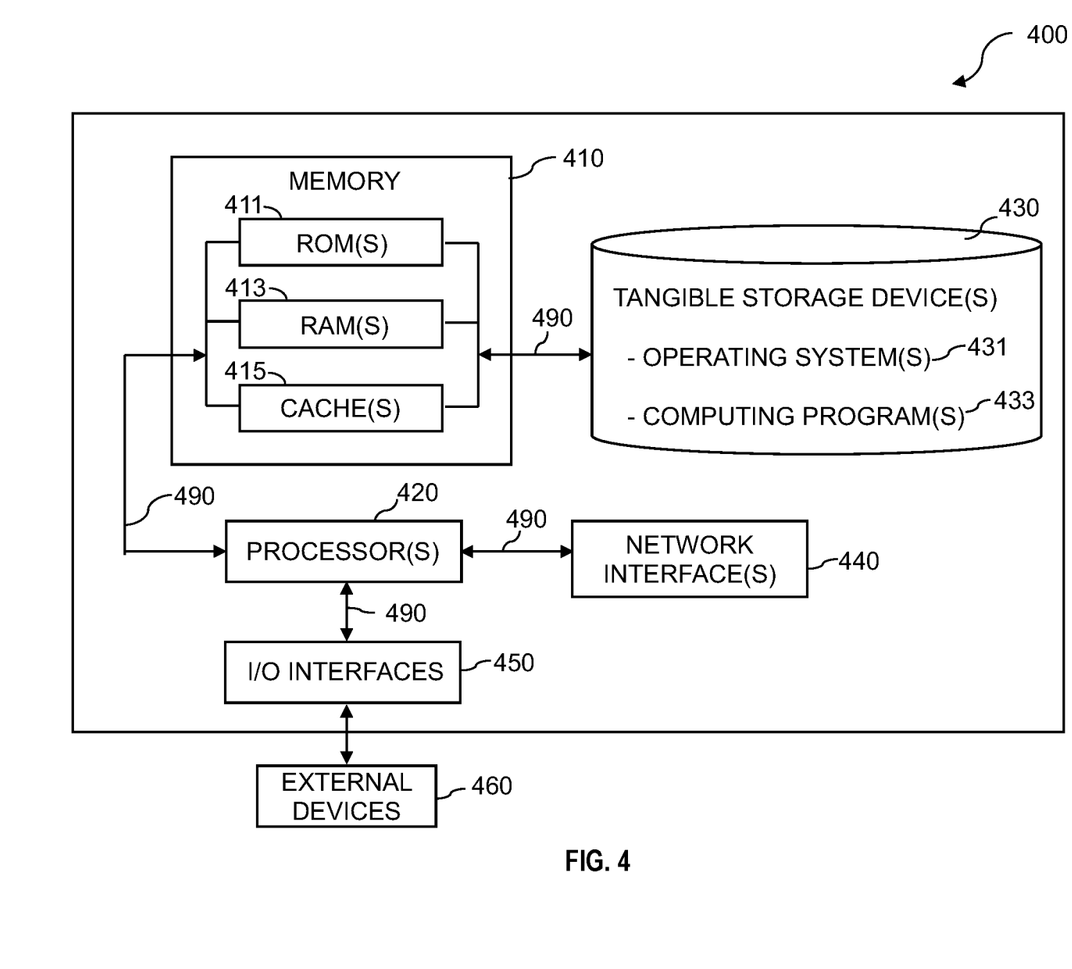
FIG. 4 is a diagram illustrating components of a computing device or server, in accordance with one embodiment of the present invention.

FIG. 4 is a diagram illustrating components of computing device or server 400, in accordance with one embodiment of the present invention. It should be appreciated that FIG. 4 provides only an illustration of one implementation and does not imply any limitations; different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
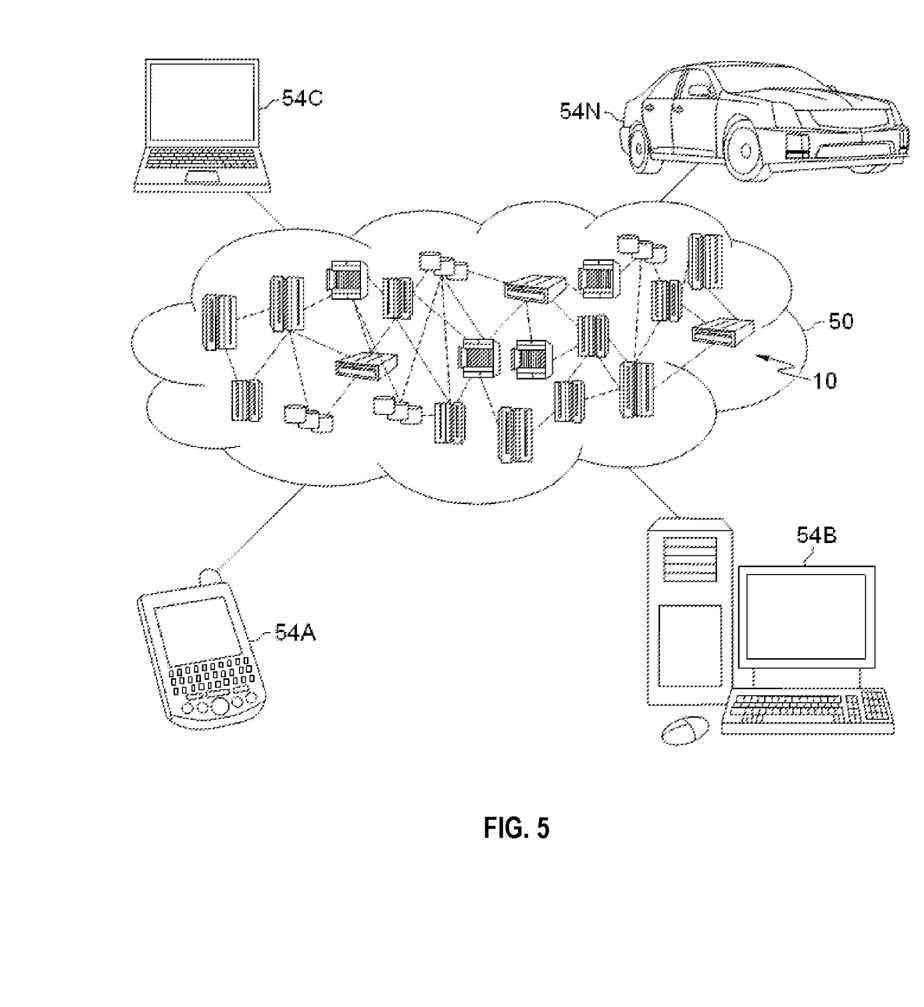
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
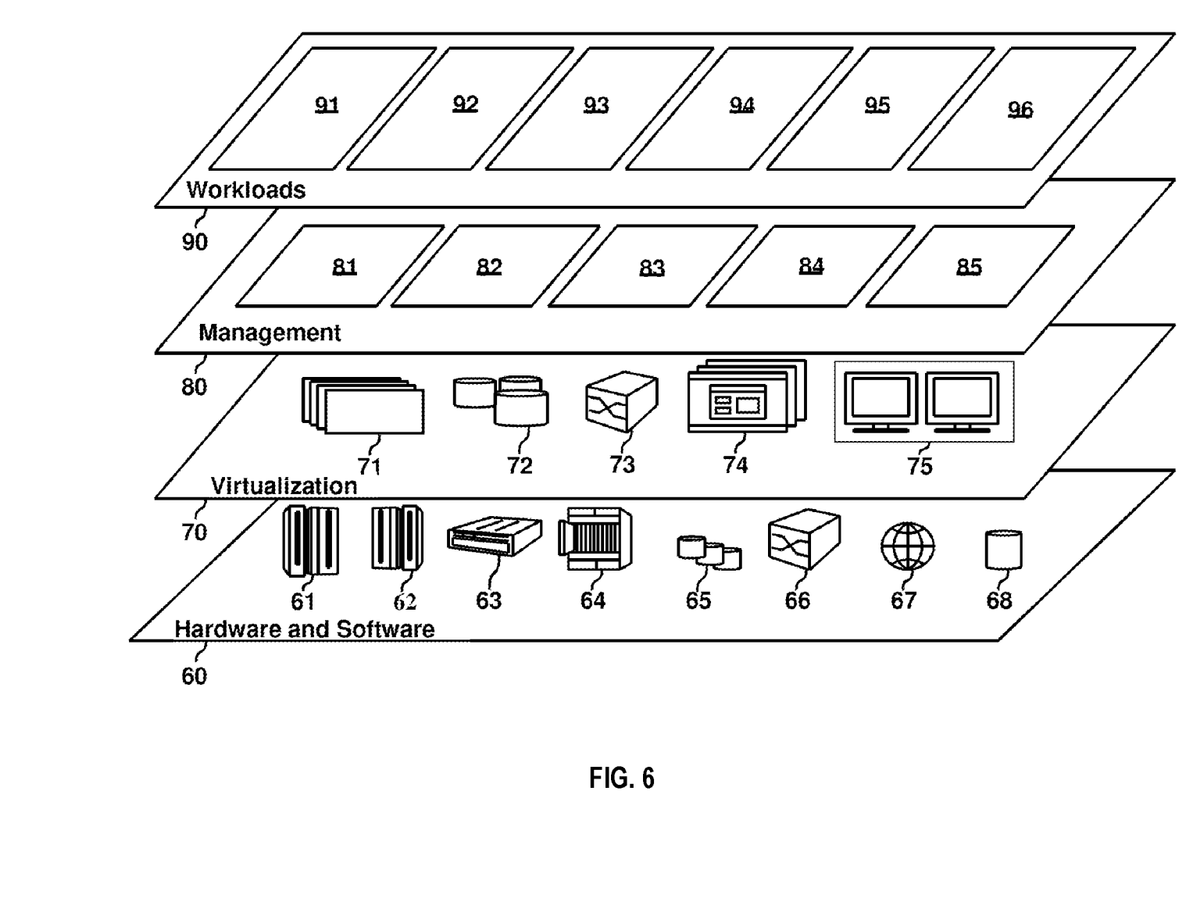
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of minimizing latency of round trip network communication in a computing infrastructure.

What is claimed is:

1. A computer-implemented method for minimizing latency in an infrastructure, the method comprising:
   receiving a request of deploying a new extract, load, and transform (ELT) logic for a new ELT process with a new data transformation method;
   analyzing the new ELT logic to identify source and target locations in the infrastructure;
   analyzing logs of existing ELT logics to identify parameters of the existing ELT logics;
   identifying physical locations of data in the infrastructure, based on the source and target locations from the new ELT logic and analysis of the logs of the existing ELT logic;

identifying available physical spaces in datacenters for relocating the data to minimize latency of round trip network communication in the new ELT process with the new data transformation method;

determining to-be-relocated data for minimizing the round trip network communication in the new ELT process with the new data transformation method, based on the physical locations of the to-be-relocated data, the available physical spaces, and the parameters of the existing ELT logics; and relocating the to-be-relocated data to the available physical spaces in the datacenters.

2. The computer-implemented method of claim 1, wherein the parameters identified through the analysis of the existing ELT logics include data movement between sources and targets in the infrastructure, data volumes for data transformation paths, time required for the data movement, frequency of the data movement, and additional time required for round trip network communications.

3. The computer-implemented method of claim 1, further comprising:
identifying data movement between sources and targets in the infrastructure, based on the analysis of the existing ELT logics.

4. The computer-implemented method of claim 1, further comprising:
identifying data volumes for data transformation paths, based on the analysis of the existing ELT logics.

5. The computer-implemented method of claim 1, further comprising:
identifying time required for data movement between sources and targets in the infrastructure, based on the analysis of the existing ELT logics.

6. The computer-implemented method of claim 1, further comprising:
identifying frequency of data movement between sources and targets in the infrastructure, based on the analysis of the existing ELT logics.

7. The computer-implemented method of claim 1, further comprising:
identifying additional time required for round trip network communications in the infrastructure, based on the analysis of the existing ELT logics.

8. A computer program product for minimizing latency in an infrastructure, the computer program product comprising a computer readable storage medium having program instructions embodied therewith, the program instructions executable by one or more processors, the program instructions executable to:

receive a request of deploying a new extract, load, and transform (ELT) logic for a new ELT process with a new data transformation method;

analyze the new ELT logic to identify source and target locations in the infrastructure;

analyze logs of existing ELT logics to identify parameters of the existing ELT logics;

identify physical locations of data in the infrastructure, based on the source and target locations from the new ELT logic and analysis of the logs of the existing ELT logic;

identify available physical spaces in datacenters for relocating the data to minimize latency of round trip network communication in the new ELT process with the new data transformation method;

determine to-be-relocated data for minimizing the round trip network communication in the new ELT process with the new data transformation method, based on the physical locations of the to-be-relocated data, the available physical spaces, and the parameters of the existing ELT logics; and relocate the to-be-relocated data to the available physical spaces in the datacenters.

9. The computer program product of claim 8, wherein the parameters identified through the analysis of the existing ELT logics include data movement between sources and targets in the infrastructure, data volumes for data transformation paths, time required for the data movement, frequency of the data movement, and additional time required for round trip network communications.

10. The computer program product of claim 8, further comprising the program instructions executable to:
identify data movement between sources and targets in the infrastructure, based on the analysis of the existing ELT logics.

11. The computer program product of claim 8, further comprising the program instructions executable to:
identify data volumes for data transformation paths, based on the analysis of the existing ELT logics.

12. The computer program product of claim 8, further comprising the program instructions executable to:
identify time required for data movement between sources and targets in the infrastructure, based on the analysis of the existing ELT logics.

13. The computer program product of claim 8, further comprising the program instructions executable to:
identify frequency of data movement between sources and targets in the infrastructure, based on the analysis of the existing ELT logics.

14. The computer program product of claim 8, further comprising the program instructions executable to:
identify additional time required for round trip network communications in the infrastructure, based on the analysis of the existing ELT logics.

15. A computer system for minimizing latency in an infrastructure, the computer system comprising one or more processors, one or more computer readable tangible storage devices, and program instructions stored on at least one of the one or more computer readable tangible storage devices for execution by at least one of the one or more processors, the program instructions executable to:

receive a request of deploying a new extract, load, and transform (ELT) logic for a new ELT process with a new data transformation method;

analyze the new ELT logic to identify source and target locations in the infrastructure;

analyze logs of existing ELT logics to identify parameters of the existing ELT logics;

identify physical locations of data in the infrastructure, based on the source and target locations from the new ELT logic and analysis of the logs of the existing ELT logic;

identify available physical spaces in datacenters for relocating the data to minimize latency of round trip network communication in the new ELT process with the new data transformation method;

determine to-be-relocated data for minimizing the round trip network communication in the new ELT process with the new data transformation method, based on the physical locations of the to-be-relocated data, the available physical spaces, and the parameters of the existing ELT logics; and relocate the to-be-relocated data to the available physical spaces in the datacenters.

16. The computer system of claim 15, wherein the parameters identified through the analysis of the existing ELT logics include data movement between sources and targets in the infrastructure, data volumes for data transformation paths, time required for the data movement, frequency of the data movement, and additional time required for round trip network communications.

17. The computer system of claim 15, further comprising the program instructions executable to:
   identify data movement between sources and targets in the infrastructure, based on the analysis of the existing ELT logics.

18. The computer system of claim 15, further comprising the program instructions executable to:
   identify data volumes for data transformation paths, based on the analysis of the existing ELT logics.

19. The computer system of claim 15, further comprising the program instructions executable to:
   identify time required for data movement between sources and targets in the infrastructure, based on the analysis of the existing ELT logics; and
   identify additional time required for round trip network communications in the infrastructure, based on the analysis of the existing ELT logics.

20. The computer system of claim 15, further comprising the program instructions executable to:
   identify frequency of data movement between sources and targets in the infrastructure, based on the analysis of the existing ELT logics.

* * * * *